(12) United States Patent
Riefel

(10) Patent No.: US 10,380,518 B2
(45) Date of Patent: Aug. 13, 2019

(54) PROCESS TRACKING AND DEFECT DETECTION

(71) Applicant: Maximus, Inc., Austin, TX (US)

(72) Inventor: Randall Riefel, Austin, TX (US)

(73) Assignee: Maximus, Reston, VA (US)

( * ) Notice: Subject to any disclaimer, the term of this patent is extended or adjusted under 35 U.S.C. 154(b) by 1237 days.

(21) Appl. No.: 14/502,783

(22) Filed: Sep. 30, 2014

(65) Prior Publication Data

US 2015/0095072 A1    Apr. 2, 2015

Related U.S. Application Data

(60) Provisional application No. 61/884,902, filed on Sep. 30, 2013.

(51) Int. Cl.
| | |
|---|---|
| *G06F 11/00* | (2006.01) |
| *G06Q 10/06* | (2012.01) |
| *G06F 11/07* | (2006.01) |
| *G06F 11/34* | (2006.01) |
| *G06Q 40/08* | (2012.01) |

(52) U.S. Cl.
CPC .... *G06Q 10/063114* (2013.01); *G06F 11/079* (2013.01); *G06F 11/0766* (2013.01); *G06F 11/3466* (2013.01); *G06Q 40/08* (2013.01)

(58) Field of Classification Search
CPC ......... G06Q 10/063114; G06Q 10/063; G06Q 10/0631; G06Q 10/06311; G06Q 10/0633; G06Q 10/0635; G06Q 10/0639; G06Q 10/06395; G06Q 40/08; G06Q 20/127;

(Continued)

(56) References Cited

U.S. PATENT DOCUMENTS

| | | | |
|---|---|---|---|
| 5,982,891 A | 11/1999 | Ginter et al. | |
| 6,021,202 A | 2/2000 | Anderson et al. | |

(Continued)

FOREIGN PATENT DOCUMENTS

| | | |
|---|---|---|
| EP | 2736002 | 5/2014 |
| GB | 2535373 | 8/2016 |

(Continued)

OTHER PUBLICATIONS

NPL01_www.dss.pdf_Archive_org_ 4_ 18_12 Department of Children and Family Services State of Louisiana.

(Continued)

*Primary Examiner* — Anthony J Amoroso
(74) *Attorney, Agent, or Firm* — Meyertons, Hood, Kivlin, Kowert & Goetzel, P.C.

(57) ABSTRACT

A system monitors request processing operations and flags process defects (for example, a request that has become orphaned, stuck, or vanished from a processing queue.). The system uses knowledge of how a business process is expected to behave to how it is actually behaving to detect exception instances. The system can detect individual process instances behaving unexpectedly as well as patterns across instance sets. In some cases, the system maintains one set of information (for example, in a database) for requests that have been input to the system, and a second set of information for requests then being processed. The system may compare the two sets of information and identify differences between the sets of information.

7 Claims, 7 Drawing Sheets

(58) Field of Classification Search
CPC ...... G06Q 20/08; G06Q 20/10; G06Q 20/102; G06Q 20/12; G06Q 20/14; G06Q 20/145
See application file for complete search history.

(56) References Cited

U.S. PATENT DOCUMENTS

| | | | |
|---|---|---|---|
| 6,507,826 B1* | 1/2003 | Maners | G06Q 20/102 705/34 |
| 6,711,253 B1 | 3/2004 | Prabhaker | |
| 6,915,254 B1 | 7/2005 | Heinze et al. | |
| 7,103,562 B2 | 9/2006 | Kosiba et al. | |
| 7,233,938 B2 | 6/2007 | Carus et al. | |
| 7,376,957 B1* | 5/2008 | Scurlock, Jr. | G06F 9/546 719/312 |
| 7,464,036 B1 | 12/2008 | Witte et al. | |
| 7,587,368 B2 | 9/2009 | Felsher | |
| 7,730,543 B1 | 6/2010 | Nath | |
| 7,853,546 B2 | 12/2010 | Damodharan | |
| 7,937,333 B2* | 5/2011 | Ryan, Jr. | G07B 17/00024 705/402 |
| 7,974,857 B1 | 7/2011 | Fischer et al. | |
| 7,996,405 B2 | 8/2011 | Shima et al. | |
| 8,086,558 B2 | 12/2011 | Dewar | |
| 8,185,430 B2 | 5/2012 | Edwards et al. | |
| 8,214,238 B1 | 7/2012 | Fairfield et al. | |
| 8,300,797 B1 | 10/2012 | Benesh et al. | |
| 8,355,926 B1 | 1/2013 | Hinz et al. | |
| 8,401,886 B2 | 3/2013 | Khetarpal et al. | |
| 8,457,544 B2 | 6/2013 | German et al. | |
| 8,488,769 B1 | 7/2013 | Noble, Jr. et al. | |
| 8,539,493 B1 | 9/2013 | Robertson et al. | |
| 8,645,175 B1 | 2/2014 | Arbogast | |
| 8,694,351 B2 | 4/2014 | Stevens et al. | |
| 8,711,732 B2 | 4/2014 | Johnson | |
| 8,811,597 B1 | 8/2014 | Hackbarth et al. | |
| 8,938,063 B1 | 1/2015 | Hackbarth et al. | |
| 9,589,244 B2 | 3/2017 | Riefel | |
| 9,614,961 B2 | 4/2017 | Riefel | |
| 2001/0047283 A1 | 11/2001 | Melick | |
| 2002/0019741 A1 | 2/2002 | Heston | |
| 2002/0102993 A1 | 8/2002 | Hendrey et al. | |
| 2002/0169718 A1 | 11/2002 | Alsofrom | |
| 2003/0110340 A1* | 6/2003 | Butler | G06F 13/4226 710/305 |
| 2004/0064330 A1 | 4/2004 | Keelan | |
| 2004/0219493 A1 | 11/2004 | Phillips | |
| 2004/0220895 A1 | 11/2004 | Carus et al. | |
| 2005/0065837 A1 | 3/2005 | Kosiba et al. | |
| 2005/0086075 A1 | 4/2005 | Kaehler et al. | |
| 2005/0129212 A1 | 6/2005 | Parker | |
| 2005/0135600 A1 | 6/2005 | Whitman, Jr. | |
| 2005/0135601 A1 | 6/2005 | Whitman, Jr. | |
| 2006/0015944 A1 | 1/2006 | Fields | |
| 2006/0129617 A1 | 6/2006 | Nagai et al. | |
| 2006/0143228 A1 | 6/2006 | Odo-Paez et al. | |
| 2006/0161464 A1 | 7/2006 | Green | |
| 2006/0179063 A1 | 8/2006 | Rose et al. | |
| 2006/0265268 A1 | 11/2006 | Hyder et al. | |
| 2007/0111176 A1 | 5/2007 | Brown | |
| 2007/0143019 A1 | 6/2007 | Feyen et al. | |
| 2007/0198322 A1 | 8/2007 | Bourne et al. | |
| 2007/0226340 A1 | 9/2007 | Hastings et al. | |
| 2007/0288759 A1 | 12/2007 | Wood et al. | |
| 2008/0077450 A1 | 3/2008 | Klippel | |
| 2008/0103828 A1 | 5/2008 | Squilla et al. | |
| 2008/0133513 A1 | 6/2008 | Linde | |
| 2008/0172286 A1 | 7/2008 | Ramanujan et al. | |
| 2009/0113427 A1 | 4/2009 | Brady et al. | |
| 2009/0150389 A1 | 6/2009 | Knorr | |
| 2009/0190760 A1 | 7/2009 | Bojinov et al. | |
| 2009/0307052 A1 | 12/2009 | Mankani et al. | |
| 2010/0076835 A1 | 3/2010 | Silverman | |
| 2010/0211516 A1 | 8/2010 | Andrekovich et al. | |
| 2010/0228563 A1 | 9/2010 | Walker | |
| 2010/0306204 A1 | 12/2010 | Chitiveli et al. | |
| 2011/0082777 A1 | 4/2011 | Chess | |
| 2011/0112879 A1 | 5/2011 | Fama | |
| 2011/0117534 A1 | 5/2011 | Berger et al. | |
| 2011/0119197 A1 | 5/2011 | Turchin | |
| 2011/0161933 A1 | 6/2011 | Hudson | |
| 2011/0166890 A1 | 7/2011 | Menschik et al. | |
| 2011/0191115 A1 | 8/2011 | Zalam | |
| 2011/0218885 A1 | 9/2011 | Manski | |
| 2011/0258132 A1 | 10/2011 | Andrekovich et al. | |
| 2011/0295623 A1 | 12/2011 | Behringer et al. | |
| 2012/0014519 A1 | 1/2012 | Kosiba et al. | |
| 2012/0022906 A1 | 1/2012 | Snyder et al. | |
| 2012/0051536 A1 | 3/2012 | Chishti et al. | |
| 2012/0077173 A1 | 3/2012 | Crawford et al. | |
| 2012/0087486 A1 | 4/2012 | Guerrero et al. | |
| 2012/0158641 A1 | 6/2012 | Klinger et al. | |
| 2013/0080239 A1 | 3/2013 | Okerlund | |
| 2013/0110758 A1 | 5/2013 | Jung et al. | |
| 2013/0132583 A1 | 5/2013 | McCord | |
| 2013/0159017 A1 | 6/2013 | Burkholder | |
| 2013/0185087 A1 | 7/2013 | Merkin | |
| 2013/0191185 A1 | 7/2013 | Galvin | |
| 2013/0198227 A1 | 8/2013 | Fradkin et al. | |
| 2013/0204757 A1 | 8/2013 | Willard | |
| 2013/0204874 A1 | 8/2013 | Frey | |
| 2013/0211856 A1 | 8/2013 | Pribyl et al. | |
| 2013/0247005 A1 | 9/2013 | Hirsch et al. | |
| 2013/0311994 A1 | 11/2013 | Jung et al. | |
| 2013/0346310 A1 | 12/2013 | Burger et al. | |
| 2014/0058927 A1 | 2/2014 | Schwarzkopf | |
| 2014/0074834 A1 | 3/2014 | Pike | |
| 2014/0095537 A1 | 4/2014 | Park et al. | |
| 2014/0136240 A1 | 5/2014 | Mahoney et al. | |
| 2014/0211931 A1 | 7/2014 | Wendt | |
| 2014/0211932 A1 | 7/2014 | Zhao et al. | |
| 2014/0211933 A1 | 7/2014 | Vymenets et al. | |
| 2014/0219436 A1 | 8/2014 | Kosiba et al. | |
| 2014/0278575 A1 | 9/2014 | Anton et al. | |
| 2014/0289147 A1 | 9/2014 | Haff et al. | |
| 2014/0304246 A1* | 10/2014 | Helmich | G06F 9/546 707/704 |
| 2014/0362984 A1 | 12/2014 | Danson et al. | |
| 2014/0365440 A1 | 12/2014 | Steiner | |
| 2015/0019451 A1 | 1/2015 | Schnack et al. | |
| 2015/0074409 A1 | 3/2015 | Reid | |
| 2015/0092936 A1 | 4/2015 | Riefel | |
| 2015/0095072 A1 | 4/2015 | Riefel | |
| 2015/0131793 A1 | 5/2015 | Riefel | |
| 2015/0154418 A1 | 6/2015 | Redberg | |
| 2015/0178458 A1 | 6/2015 | Pellinat et al. | |
| 2015/0356250 A1 | 12/2015 | Polimeni | |
| 2016/0012561 A1 | 1/2016 | Lappenbusch | |
| 2016/0044040 A1 | 2/2016 | Caffary, Jr. | |
| 2016/0048758 A1 | 2/2016 | Campbell | |
| 2016/0239931 A1 | 8/2016 | Sabri et al. | |
| 2018/0232487 A1 | 8/2018 | Erard et al. | |
| 2018/0232493 A1 | 8/2018 | Erard et al. | |
| 2018/0232812 A1 | 8/2018 | Erard et al. | |

FOREIGN PATENT DOCUMENTS

| | | |
|---|---|---|
| WO | 2015/048789 | 4/2015 |
| WO | 2015/048790 | 4/2015 |
| WO | 2015048787 | 4/2015 |
| WO | 2016/123542 | 8/2016 |

OTHER PUBLICATIONS

NPL02_WebTA, https://web.archive.org/web/20120925014615/http://www.treasury.gov/services/gov-shared-services/H R- Connect/Pages/webTA.aspx, Wayback Machine Sep. 25, 2012.

NPL03_UI Reemployment Services, https://web.archive.org/web/20100601220034/https://dwd.wisconsin.gov/observice/Reemployment.html, Wayback Machine Jun. 1, 2010.

NPL04_Proving active job search for unemployment benefits, Posted Aug. 23, 2010 ("JobSearch").

NPL12_A news release for DDtrac by Developing Minds Software, http://news.developingmindssoftware.com/?p=124, dated Jun. 8, 2008.

(56) References Cited

OTHER PUBLICATIONS

NPL13_A User's Guide for ddtrac by Developing Minds Software, https://www.ddtrac.com/demo/wiki_asp?page=Progress+Chart.
NPL14_A paper on Rapid Response Request by the Southeast Comprehensive Center, Table 1, http://secc.sedl.org/prc/rr/secc_rr_00080.pdf, Mar. 13, 2009.
NPL15_Release notes for the NYC Special Education Student Information System ("SESIS"), SESIS Release Notes, May 6, 2013, pp. 3-5.
NPL16_A release for the Illinois Medicaid Redetermination Project (IMRP) by Illinois Department of Human Services dated Feb. 6, 2014 ("IMRP Release"), IMPR Release, http://www.dhs.state.il.us/page.aspx?item=68456, pp. 1-2.
NPL17_A Policy Memo on the Illinois Medicaid Redetermination Project by the Illinois Department of Healthcare and Family Services ("IMRP Policy Memo"), IMPR Policy Memo dated Feb. 13, 2013, https://www.dhs.state.il.us/page.aspx?item=62971, pp. 1-4.
NPL18_A brochure for MedicareMVP from eSolutions, Inc., MedicareMVP brochure, www.esolutionsinc.com/medicare-eligibility-verification.
NPL19_A paper entitled Integrated Eligibility on a website of the State of Ohio, Integrated Eligibility, http://www.healthtransformation.ohio.gov/LinkClick.aspx?fileticket=pWekJiFe9O4%3d&tabid=117, pp. 2-5.
NPL20_"TechSource National Acquires IMEBASE, The Industry's Premier Cloud-Based IME Software" http://www.imebase.com/news/techsource-national-acquires-imebase-the-industrys-premier-cloud-based-ime-software/. Jul. 15, 2015.
NPL21_Humana webpage, Medical records review for healthcare providers, https://www.humana.com/provider/support/clinical/medical-records. Dec. 1, 2016.
NPL22_Article, VA blog, "New tool launches to improve the benefits claim appeals process at the VA", http://www.blogs.va.gov/VAntage/27107/new-tool-launches-improve-benefits-claim-appeals-process-va/ Dec. 1, 2016.
NPL23_Savkov, A. et al. "Annotating patient clinical records with syntactic chunks and named entities: the Harvey Corpus". Lang Resources & Evaluation 50:523-548. Published online: Jan. 11, 2016.
NPL24_Practice Fusion EHR Software "Save Time with Smart Charting". https://www.practicefusion.com/medical-chart-ehr/. Dec. 1, 2016.
Co-Pending U.S. Appl. No. 15/430,131 entitled, "Secure Document Exchange Portal System With Efficient User Access" to Erard et al. filed Feb. 10, 2017.
Co-Pending U.S. Appl. No. 15/430,136 entitled, "Document Classification Tool for Large Electronic Files" to Erard et al. filed Feb. 10, 2017.
Co-Pending U.S. Appl. No. 15/430,142 entitled, "Case-Level Review Tool for Physicians" to Erard et al. filed Feb. 10, 2017.
Non-Final Office Action for U.S. Appl. No. 13/845,968 dated Aug. 3, 2015.
Final Office Action for U.S. Appl. No. 13/845,968 dated May 31, 2016.
Non-Final Office Action for U.S. Appl. No. 13/845,968 dated Feb. 17, 2017.
Non-Final Office Action for U.S. Appl. No. 14/184,459 dated Apr. 24, 2014.
Non-Final Office Action for U.S. Appl. No. 14/184,459 dated Aug. 25, 2014.
Final Office Action for U.S. Appl. No. 14/184,459 dated Jan. 23, 2015.
Non-Final Office Action for U.S. Appl. No. 14/184,459 dated Sep. 8, 2015.
Final Office Action for U.S. Appl. No. 14/184,459 dated Mar. 16, 2016.
Non-Final Office Action for U.S. Appl. No. 14/184,459 dated Jan. 31, 2017.
Non-Final Office Action for U.S. Appl. No. 14/201,211 dated Jun. 6, 2014.
Non-Final Office Action for U.S. Appl. No. 14/201,211 dated Oct. 21, 2014.
Final Office Action for U.S. Appl. No. 14/201,211, dated May 20, 2015.
Non-Final Office Action for U.S. Appl. No. 14/201,211, dated Dec. 18, 2015.
Final Office Action for U.S. Appl. No. 14/201,211, dated May 6, 2016.
Non-Final Office Action for U.S. Appl. No. 14/201,211, dated Sep. 21, 2016.
Final Office Action for U.S. Appl. No. 14/201,211, dated Feb. 6, 2017.
Non-Final Office Action for U.S. Appl. No. 14/502,807, dated Mar. 11, 2016.
Notice of Allowance for U.S. Appl. No. 14/502,807, dated Nov. 18, 2016.
NPL11_International Search Report and Written Opinion, Application No. PCT/U516/015758, dated Jun. 3, 2016, 14 pages.
Final Office Action for U.S. Appl. No. 14/502,828, dated Jun. 2, 2016.
Notice of Allowance for U.S. Appl. No. 14/502,828, dated Oct. 24, 2016.
Non-Final Office Action, U.S. Appl. No. 14/502,807, dated Mar. 25, 2015, 13 pages.
Final Office Action, U.S. Appl. No. 14/502,807, dated Oct. 30, 2015, 18 pages.
Non-Final Office Action, U.S. Appl. No. 14/502,828, dated Oct. 1, 2015, 13 pages.
International Preliminary Report on Patentability, Application No. PCT/US14/58425, dated Sep. 24, 2015, 4 pages.
International Search Report and Written Opinion, Application No. PCT/US14/58425, dated Feb. 24, 2015, 19 pages.
International Preliminary Report on Patentability, Application No. PCT/US14/58431, dated Feb. 16, 2016, 5 pages.
International Search Report and Written Opinion, Application No. PCT/US14/58431, dated Aug. 27, 2015, 11 pages.
International Preliminary Report on Patentability, Application No. PCT/US14/58432, dated Nov. 12, 2015, 7 pages.
International Search Report and Written Opinion, Application No. PCT/US14/58432, dated Jun. 18, 2015, 7 pages.
Examiner's Answer to Appeal Brief for U.S. Appl. No. 14/184,459 dated Aug. 10, 2017.
Non-Final Office Action for U.S. Appl. No. 14/502,783, dated Dec. 20, 2018.
Final Office Action for U.S. Appl. No. 15/011,032, dated Oct. 19, 2018.
Advisory Action for U.S. Appl. No. 15/011,032, dated Nov. 19, 2018.
Non-Final Office Action for U.S. Appl. No. 15/011,032, dated Jan. 11, 2019.
Non-Final Office Action for U.S. Appl. No. 15/430,136, dated Nov. 15, 2018.
Final Office Action for U.S. Appl. No. 15/430,136, dated May 31, 2019.
Final Office Action for U.S. Appl. No. 15/430,142, dated Jun. 3, 2019.
NPL25_Apply Process, https://web.archive.org/web/20130309192515/http://hrisguide.unc.edu/epa-rw/lessons/Department_Quick_Apply_Process.html, Wayback Machine Mar. 9, 2013.
Non-Final Office Action for U.S. Appl. No. 14/201,211, dated Jun. 23, 2017.
Final Office Action for U.S. Appl. No. 14/201,211, dated Jan. 29, 2018.
Advisory Action for U.S. Appl. No. 14/201,211, dated Apr. 11, 2018.
Non-Final Office Action for U.S. Appl. No. 14/502,783, dated Oct. 6, 2017.
Non-Final Office Action for U.S. Appl. No. 14/502,783, dated May 16, 2018.
Non-Final Office Action for U.S. Appl. No. 15/011,032, dated Jul. 20, 2018.

(56) References Cited

OTHER PUBLICATIONS

NPL26_International Search Report and Written Opinion, Application No. PCT/US18/17433, dated Apr. 24, 2018, 15 pages.

* cited by examiner

| | User ID | Claimed | Completed |
|---|---|---|---|
| Scan | 1234 | 15 | 14 |
| | 1354 | 1 | |
| | 1878 | 15 | |
| | 1654 | 11 | |
| | 1287 | 10 | 6 |
| | 1355 | 6 | 3 |
| | 1966 | 3 | 2 |
| | 1209 | 5 | 2 |
| QC | 1234 | 12 | 10 |
| | 1354 | 11 | |
| | 1878 | 4 | 3 |
| | 1654 | 12 | |
| | 1287 | 7 | |
| | 1355 | 8 | 4 |
| | 1355 | 1 | 1 |
| Classification | 1654 | 2 | 2 |
| | 1287 | 3 | 3 |
| | 1355 | 5 | 4 |
| | 1355 | 10 | |
| | 1234 | 9 | |
| | 1354 | 8 | 6 |
| | 1354 | 6 | 6 |

FIG. 5

PROCESS TRACKING AND DEFECT DETECTION

PRIORITY CLAIM

This application claims priority to U.S. Provisional Application Ser. No. 61/884,902 entitled "PROCESS TRACKING AND DEFECT DETECTION" filed Sep. 30, 2013, which is incorporated herein by reference in its entirety.

BACKGROUND

Field

The present invention relates to the field of client services. More particularly, the present invention relates to tracking processes arising from client requests and information submissions.

Description of the Related Art

Consumers, businesses, and other persons who receive products, services, and benefits from business and government entities must often submit requests or information submissions to the provider. For example, a person seeking to enroll in an insurance plan may need to request acceptance into the plan by way of an enrollment process, and submit documentation to establish eligibility for the insurance. Increasingly, such requests and submissions may be made by way of electronic communications, such as the internet.

Responding to a request for a particular service, product, or benefit may be a complex process that takes time and involve many steps and interactions (such as, for example, applying for a government benefit.) The amount of resources required (including computing, network, and/or staff) to handle the load may be difficult to predict and plan for. Moreover, defects may occur in processing that prevent or delay successful fulfillment of a request. For example, a request may become stalled or be lost from a processing queue. In addition, in cases where each of a large number of processes is carried out by multiple computer systems, over multiple channels of communication (for example, voice, web chat, and text), identifying and correcting defects, redundancies, snags, and inefficiencies in computer-implemented processes may be difficult or impossible to do in timely manner.

SUMMARY

Systems and methods of processing requests and for detecting and responding to defects in processes are disclosed. In an embodiment, a method of identifying defects in request processing operations includes generating, by a process tracking system implemented on one or more computer systems, a request-made set of information including information about requests that have been made to a system. Request processing operations in the system are monitored. Monitoring request processing operations includes generating an active-processing set of information in which the active-processing set of information includes information on requests then being processed. For at least one request made to the system, the active processing set of information is compared with the request-made set of information. Based on the comparison between the active-processing set of information and the request-made set of information, one or more process defects in the request processing operations are identified. At least one request associated with at least one of the identified defects is flagged.

In an embodiment, a system includes one or more computer systems configured to implement a process tracking system. The process tracking system is configured to: generate a request-made set of information including information about requests that have been made to a system; monitor request processing operations in the system; identify, based on the comparison between the active-processing set of information and the request-made set of information, one or more process defects in the request processing operations; and flag at least one request associated with at least one of the identified defects. Monitoring request processing operations includes generating an active-processing set of information, wherein the active-processing set of information includes information on requests then being processed; and comparing, for at least one request made to the system, the active processing set of information with the request-made set of information.

In an embodiment, a tangible, computer readable medium includes program instructions stored thereon that, when executed on one or more computers, cause the one or more computers to implement a process tracking system configured to: generate a request-made set of information including information about requests that have been made to a system; identify, based on the comparison between the active-processing set of information and the request-made set of information, one or more process defects in the request processing operations; and flag at least one request associated with at least one of the identified defects. Monitoring request processing operations in the system includes generating an active-processing set of information, wherein the active-processing set of information includes information on requests then being processed; and comparing, for at least one request made to the system, the active processing set of information with the request-made set of information.

In an embodiment, a method of managing information received by batch capture into a system includes setting one or more untimeliness risk thresholds. The untimeliness thresholds include criteria for when a batch is at risk for being untimely. One or more untimeliness risk events are defined. At least one of the untimeliness risk events includes meeting or exceeding at least one of the untimeliness risk thresholds. Inbound information received into a batch capture system by way of mail or facsimile transmission is monitored by the process tracking system. In response to detection of one or more of the untimeliness risk events, one or more alerts to one or more persons by the process tracking system.

In an embodiment, a system includes one or more computer systems configured to implement a process tracking system. The process tracking system is configured to: set one or more untimeliness risk thresholds, wherein the untimeliness thresholds comprise criteria for when a batch is at risk for being untimely; define one or more untimeliness risk events, wherein at least one of the untimeliness risk events includes meeting or exceeding at least one of the untimeliness risk thresholds; monitor inbound information received into a batch capture system by way of mail or facsimile transmission; and send, in response to detection of one or more of the untimeliness risk events, one or more alerts to one or more persons.

In an embodiment, a tangible, computer readable medium includes program instructions stored thereon that, when executed on one or more computers, cause the one or more computers to implement a contact management system configured to: set one or more untimeliness risk thresholds, wherein the untimeliness thresholds comprise criteria for when a batch is at risk for being untimely; define one or more untimeliness risk events, wherein at least one of the untimeliness risk events includes meeting or exceeding at least one of the untimeliness risk thresholds; monitor inbound information received into a batch capture system by way of mail or facsimile transmission; and send in response to detection of one or more of the untimeliness risk events, one or more alerts to one or more persons.

BRIEF DESCRIPTION OF THE DRAWINGS

FIG. 5 illustrates one embodiment of a dashboard panel display of a staff productivity panel.

Figure 1:
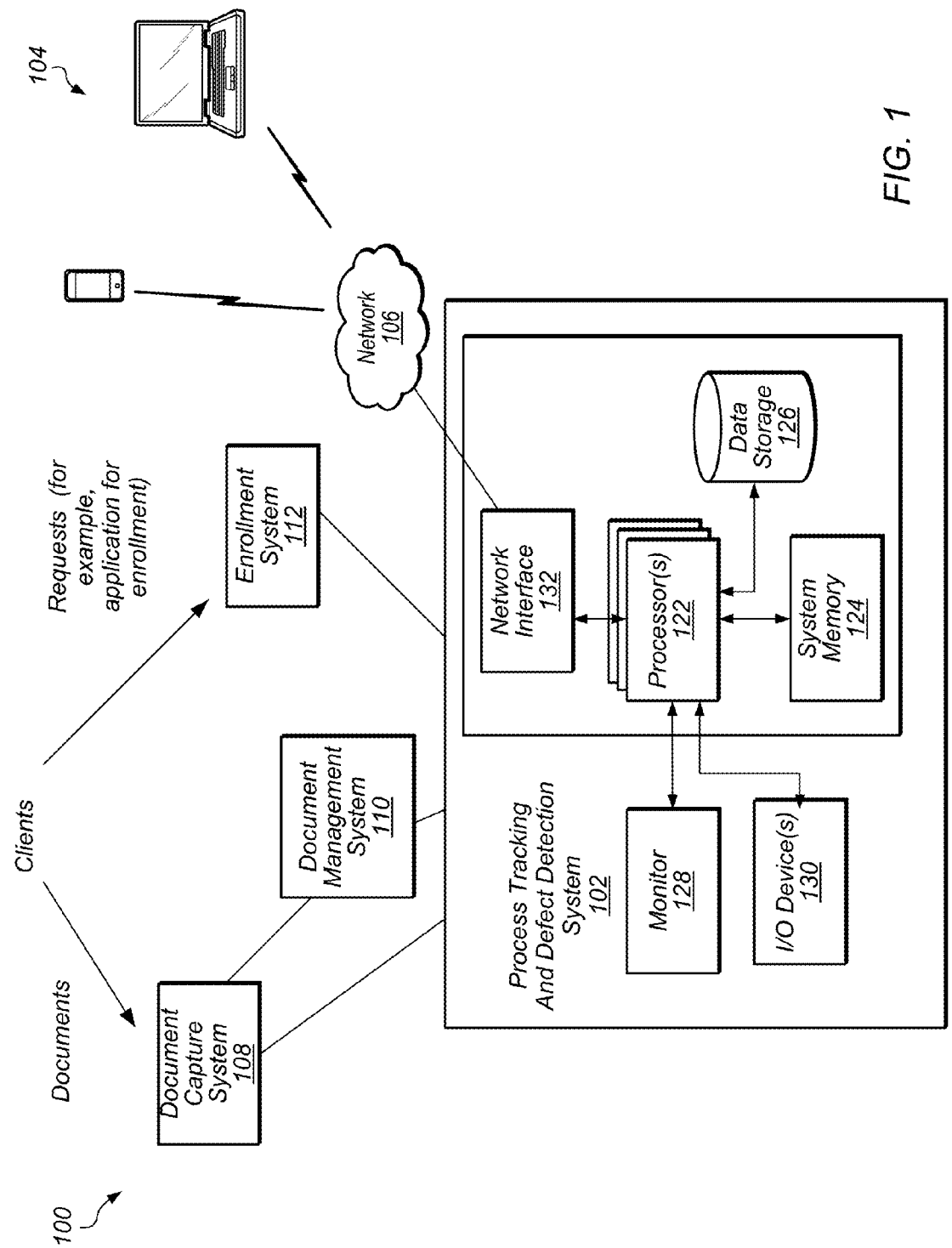
FIG. 1 illustrates one embodiment of a process tracking and defect detection system for tracking a document submissions and enrollment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF ILLUSTRATIVE EMBODIMENTS

In some embodiments, a system monitors request processing operations and flags process defects (for example, a request that has become orphaned, stuck, or vanished from a processing queue.). The system uses knowledge of how a business process is expected to behave to how it is actually behaving to detect exception instances. In some cases, the system performs detection of such exception instances in real-time or near real-time. The system can detect individual process instances behaving unexpectedly as well as patterns across instance sets. In some embodiments, the system maintains one set of information (for example, in a database) for requests that have been input to the system, and a second set of information for requests then being processed. The system may compare the two sets of information and identify differences between the sets of information. In some cases the system will compare the actual intake, aging, or completions to predicted values obtained through simulation and optimization. From the differences, the system may identify requests that have gone missing or stalled, the nature of the processing defect for each processing defect (for example, the reason the request stalled), and the consequences/effect of each defect. In some cases, the system reports defects to a user in real-time. In some cases, the system automatically recommends corrective action for processing defects.

In some embodiments, a mail/fax batch monitoring system provide batch level monitoring on all inbound client information received via mail or fax and processed through a batch capture system. Designated staff members may be notified upon detection of pre-defined events. Events that trigger alerts may include a batch reaching a designated threshold in which the batch is at risk for being untimely (in "jeopardy"). The system may provide end-to-end batch process traceability from the time of the scan or receipt of the fax to the release of the batch containing the document images to a document management system. Length of time to complete the mail/fax batch process (cycle time), work completed or claimed by staff (staff productivity), timeliness, arrival and completion volume, and other performance and process characteristics may be measured. Key performance indicators may be reported via dashboards, alerts, reports and other analytical tools.

In some embodiments, actions carried out by a person or group of persons (for example, agents at a contact center) or processes performed on a computing system are part of an enrollment or application process for an individual or group of individuals to receive a benefit. For example, an individual seeking to enroll in a plan may, by way of a computer network, submit an application for enrollment in an insurance plan, request information about a plan, or make requests for information about a plan, submit information to support an application, or receive notifications relating to the plan.

Agents or other service personnel perform actions relating to a benefit, such as handling contacts relating to enrollment requests, determining eligibility, and managing complaints and appeals. In some embodiments, a system monitors processes and detects defects in processes relating to enrollment.

As used herein, "client" means, in the context of a provider of products or services, a person who has received products or services, who is receiving products or services, or is seeking to acquire products or services. "Client" includes a person seeking or receiving a benefit (for example, a government benefit such as a tax credit, access to a potential employer, or insurance coverage) or assistance.

As used herein, "contact" refers to a contact by client or other person. Examples of modes of contacts include inbound calls and web chat inquiries. Contacts may originate from any person or group, including customers, subscribers, purchasers, enrollees, potential enrollees, general citizens, providers, health plans, or others, including anonymous callers. "Contacts" also includes program information or health plan enrollment activities.

FIG. 1 illustrates one embodiment of a processing tracking system connected to user devices over a network. System 100 includes process tracking and defect detection system 102, user devices 104, network 106, document capture systems 108, document management system 110, and enrollment system 112. Users (for example, an analyst, or management personnel) may access information from process tracking and defect detection system 102 by way of network 106. In some embodiments, some or all of document capture systems 108, document management system 110, and enrollment system 112 may be connected to process tracking and defect detection system 102 by way of a network.

Process tracking and defect detection system 102 may monitor, track, and report on processes carried out in document capture systems 108, document management system 110, and enrollment system 112. For example, process tracking and defect detection system 102 may track document processing from clients via document capture systems 108 and document management system 110, and enrollment requests from clients made to enrollment system 112.

User devices 104 may be portable electronic devices. User devices 104 may be connected with one another and with process tracking and defect detection system 102 by way of network 106. Examples of portable electronic devices 104 include a smart phone, a tablet computer, or a pager. User devices 104 may enable communication, task management, and reporting between one another and between other systems on network 106.

User devices 104 may be connected to the network over any suitable medium, such as electrical or optical cable, or via any suitable wireless standard such as IEEE 802.11 ("Wi-Fi"), IEEE 802.16 ("WiMax"), or cellular network.

Although for illustrative purposes only a single notebook computer and a single portable electronic devices are shown in FIG. 1, a system may in various embodiments have any number, and any of various types, of portable or fixed electronic devices. In some embodiments, may be a fixed workstation (for example, a PC in the home of a participant).

Process tracking and defect detection system 102 includes one or more processors 122, system memory 124, and data storage device 126. Program instructions may be stored on system memory 124. Processors 122 may access program instructions on system memory 124. Processors 122 may access data storage device 126. Users may be provided with information from workforce management system 102 by way of monitor 128. Users interact with computer system 120 by way of I/O devices 130. An I/O device 130 may be, for example, a keyboard or a mouse. Workforce management system 102 may include, or connect with, other devices 136. Elements of computer system 120 may connect with other devices, such as computer systems in stores 104, by way of network 106 and network 108 via network interface 132. Network interface 132 may be, for example, a network interface card.

As illustrated in FIG. 1, process tracking and defect detection system 102 may include and may be implemented as multiple functional modules or components, with each module or component including one or more provider network resources (e.g., computing resources, storage resources, database resources, etc.). Process tracking and defect detection system 102 may include more or fewer components or modules, and a given module or component may be subdivided into two or more sub-modules or sub-components. Also, two or more of the modules or components as shown can be combined.

In some embodiments, a system includes an imaging system for processing the forms and correspondence received by the Enrollment system by mail or fax. The related forms may include enrollment forms, disenrollment forms, transfer forms, good cause request forms, exemption/exclusion forms, fair hearing requests, surveys, and general correspondence. Forms are scanned into the imaging solution, classified by form type, linked to the appropriate case, client, and/or transaction, and data entered.

Depending on the presence of a bar-code printed when the form was sent to the client, the classification and linking steps may be accomplished automatically by the system. If a document is linked directly to a case and/or client or indirectly through another transaction that is linked to the case and/or client, it can be accessed later through the case-level document screen. All documents associated with a case and/or its members can be viewed from this screen.

The imaging process may begin with a batch of documents being scanned into the system. The forms may include a barcode, which is associated with an outbound letter request. When the form is scanned, the Imaging system reads the barcode. The bar code information and other data pertaining to the image are captured; this is the image metadata. Once all documents have been scanned, the Imaging system sends the image metadata and the image to a Document Management System (DMS). The DMS is the storage location for all images and the image metadata. The image metadata may be captured in a database with the corresponding location for the image.

Once the DMS receives the image and image metadata, the DMS sends the necessary image metadata needed to trigger the processing of the forms. An Envelope Control Number (ECN) and Document Control Number (DCN) assigned by the DMS may be part of the image metadata. The ECN may be assigned to the entire envelope of documents. The DCN may be assigned to the various documents within an envelope.

If the image has a bar code, the letter request ID is used to auto link the image to its associated case, case members or even specific transactions (for example, selection records). The letter type from the bar code may be used to classify the form and trigger workflow. Work flow tasks may be created based on the letter type workflow rules. Once the task is created, the users have the ability to claim and work these tasks.

In some embodiments, a Mail/Fax Batch process represents the imaging of envelopes/documents received as mail from a Post Office or electronically as faxes from the fax server. This process may be part of a document tracking parent process. The document tracking parent process may be made up of a Mail/Fax Batch process and a Mail/Fax Documents process. The Mail/Fax Batch process may end when a batch of document images is transmitted to a Document Management System (DMS), which may trigger the beginning of the Mail/Fax Documents process.

A Mail/Fax Batch system may provide batch level monitoring on inbound client information received via mail or fax and processed through a batch-based capture system. In one embodiment, a Mail/Fax Batch Module provides information on the following:

Batches created (Intake)
Batches released to the DMS (Completion)
Batches created but not released to the DMS or cancelled (Inventory)
Batches at risk of being processed untimely (Jeopardy)
Length of time to complete the Mail/Fax Batch process (Cycle Time)
Work completed or claimed by staff (Staff Productivity)
Batch module data In some embodiments, a mail/fax batch system provides project management with actionable information through alerts. Designated staff members may be notified via email upon detection of defined events. Events that trigger alerts may include: when a batch reaches a designated threshold in which it is at risk for being untimely, or when a batch becomes untimely. The mail/fax batch system may provide end-to-end batch process traceability, (for example, from the time of the scan or receipt of the fax to the release of the batch containing the document images to the Document Management System). Alerts to project managers, supervisors, analysts or other project designated staff to be notified upon detection of defined events (for example, when batch is in jeopardy of being processes untimely).

In some embodiments, a system performs computations and generates graphical or tabular information about operations or processes, such as system performance, agent performance, agent efficiency, task management, workflow management, or defect detection. Information from computations performed by the system may be presented to users in the form of dashboards, reports, and alerts. In some embodiments, the system performs computations to perform an optimization, a simulation, or both.

In various embodiments, a mail/fax batch tracking system provides users with displays including key performance indicators, dashboards, alerts, reports and analytics. Examples of key performance indicators, dashboards, alerts, reports and analytics that may be included in a system in various embodiments are described below.

Mail/Fax Batches Dashboard

In some embodiments, a Mail/Fax Batches Dashboard provides a user with a snapshot of the current batch process metrics (inventory, arrival and completion volumes, cycle time, timeliness, productivity).

Figure 2:
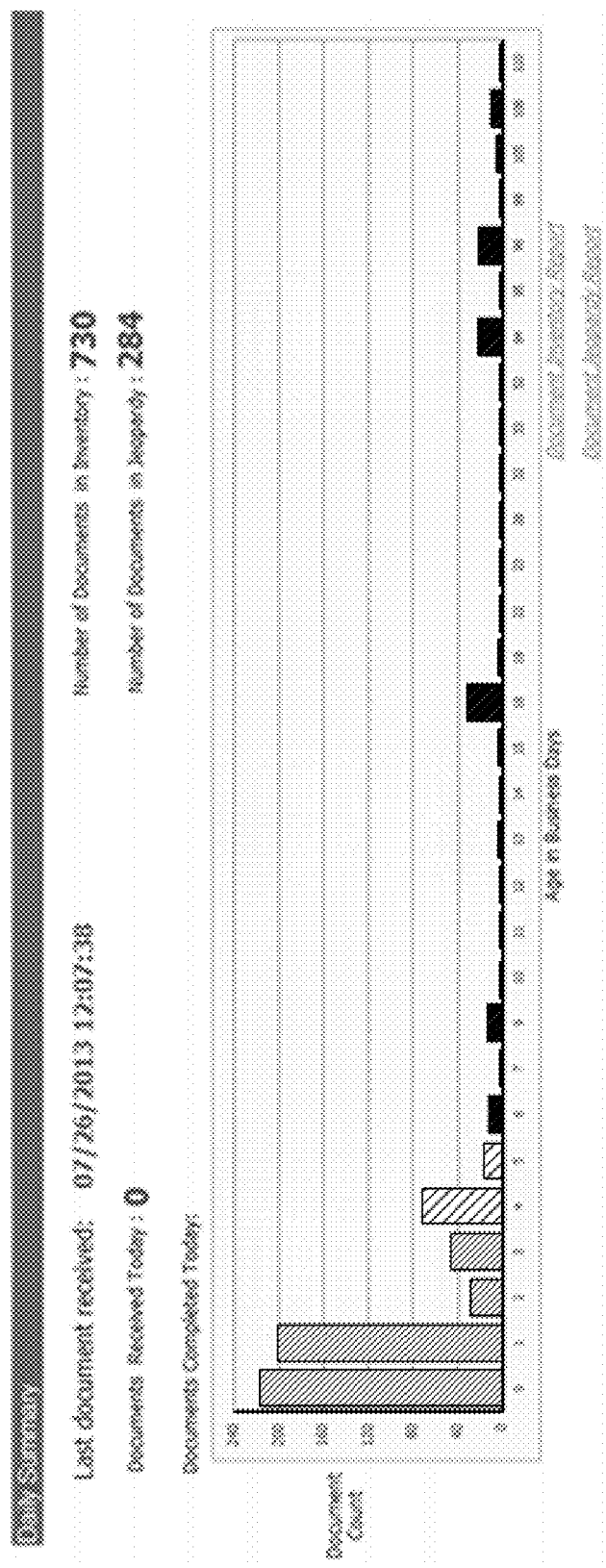
FIG. 2 illustrates one embodiment of a dashboard panel display including a daily summary of mail/fax batch information.
Figure 3:
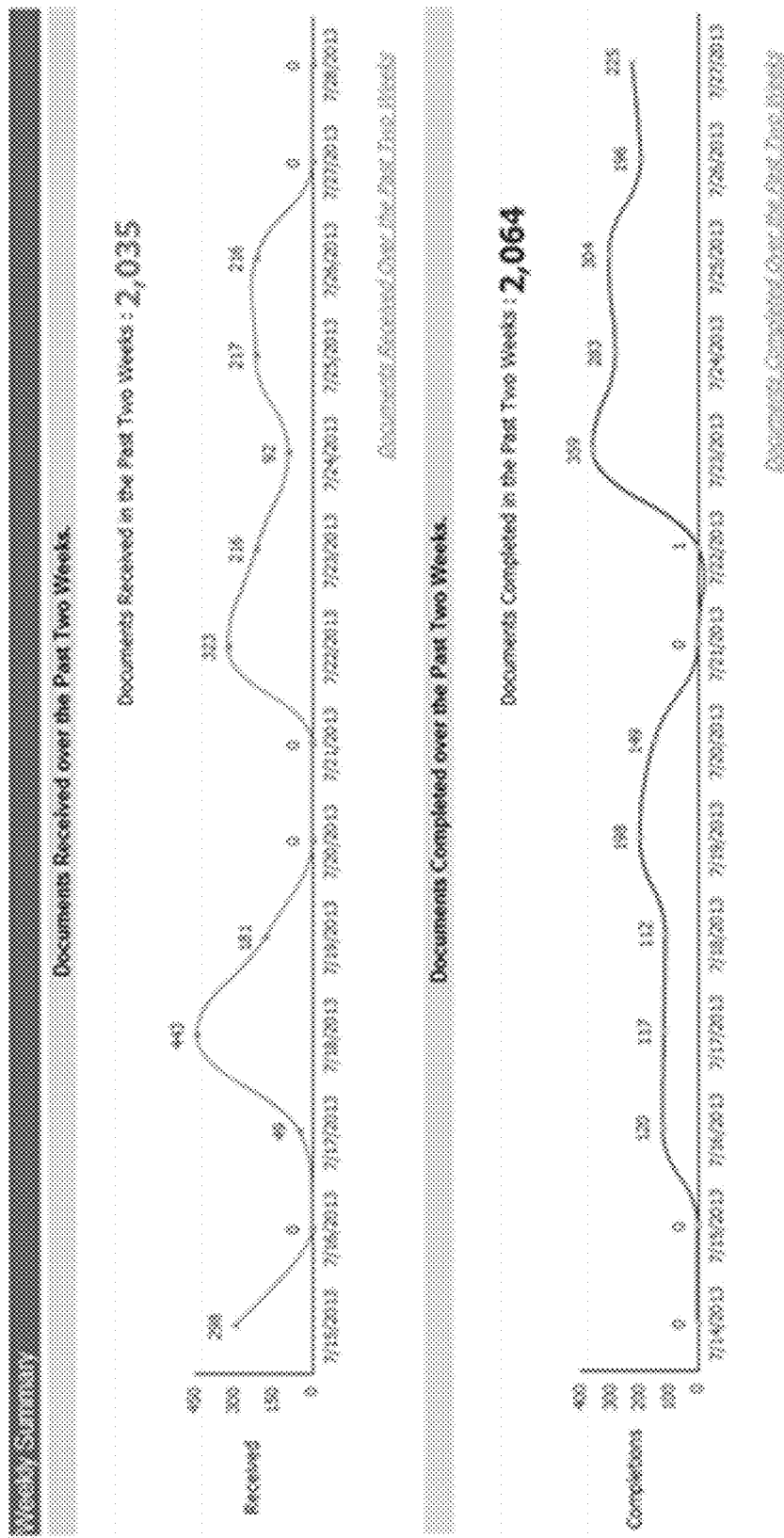
FIG. 3 illustrates one embodiment of a dashboard panel display including a weekly summary of mail/fax batch information.
Figure 4:
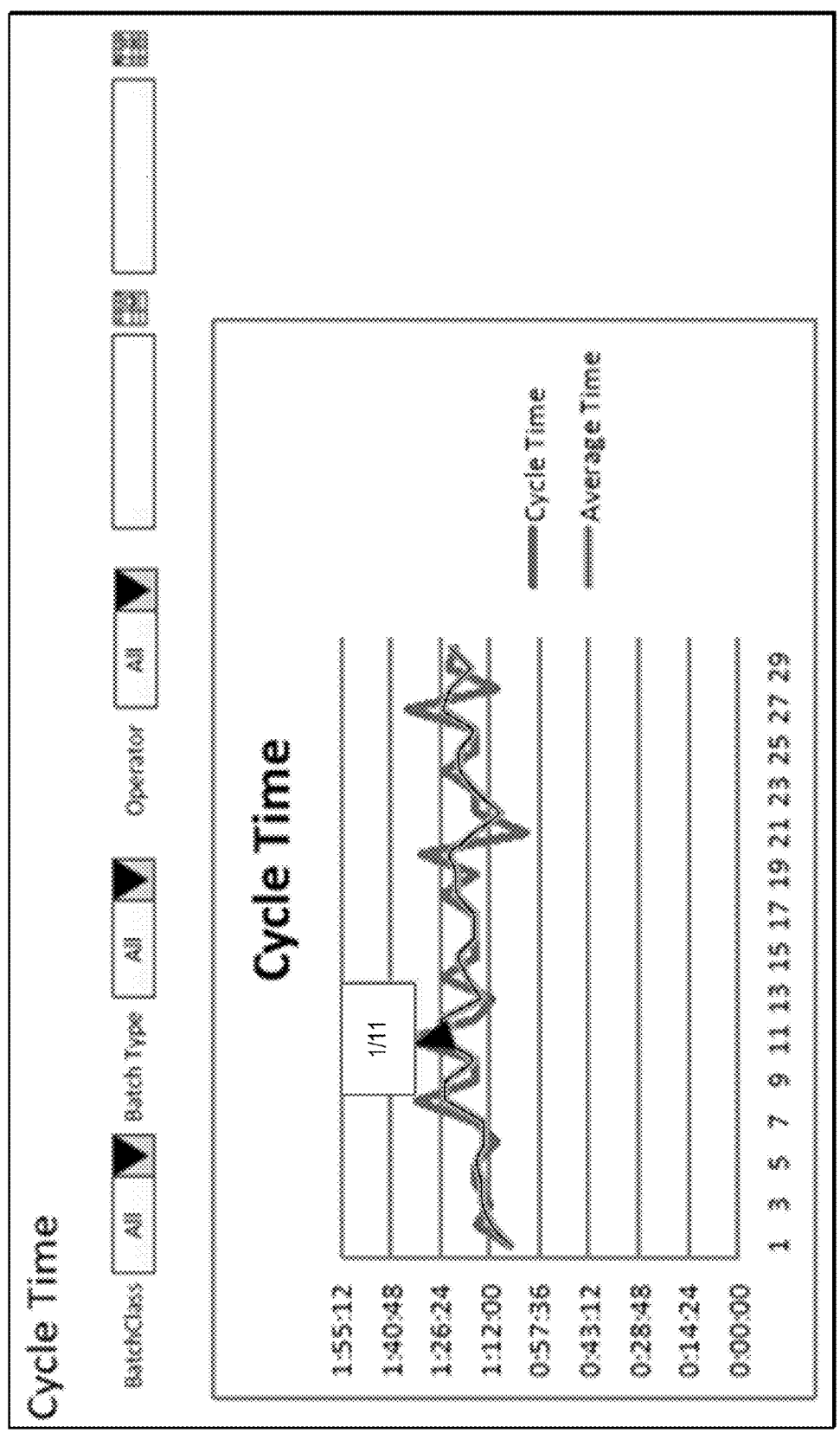
FIG. 4 illustrates one embodiment of a dashboard panel display including a summary of process cycle time and timeliness.
Figure 6:
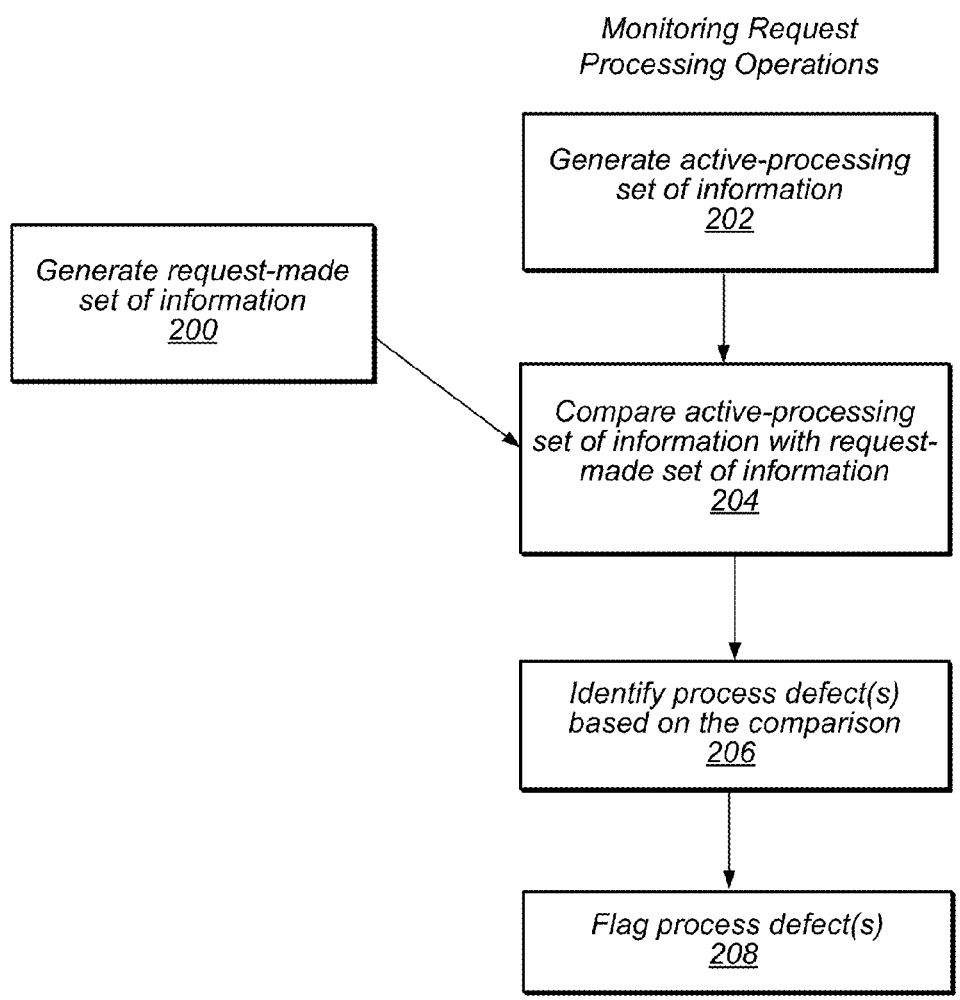
FIG. 6 illustrates one embodiment of a method of identifying defects in request processing operations.

Summary Tab: This tab displays current summary information for monitoring batches
Tab Filters:
Batch Class
Batch Type
1. Daily Summary—This panel presents the following:
Date/time of last batch received
Number of batches received for current day
Number of batches completed for current day
Number of batches in inventory
Link to Batch Inventory detail report
Number of batches in jeopardy
Link to Batch Jeopardy detail report
Bar graph of batch inventory by age in business hours (y: batch count vs. x: hours. Bars colored green/yellow/red for timely/in jeopardy/untimely respectively).
FIG. 2 illustrates one embodiment of a dashboard panel display including a daily summary of mail/fax batch information.
2. Weekly Summary—This panel presents the following:
Line graph of batches received by day for the past two weeks (y: batch count vs. x: date).
Link to Batches Received detail report
Line graph of batches completed by day for the past two weeks (y: batch count vs. x: date).
Link to Batches Completed detail report
FIG. 3 illustrates one embodiment of a dashboard panel display including a weekly summary of mail/fax batch information.
3. Process Cycle Time & Timeliness Summary—This panel presents the following:
Cumulative percentage of batches completed timely for the current month
Control chart of the average cycle time of batches completed by day for a rolling 10 business day period. (y: hours vs. x: day with yellow/red jeopardy/timeliness thresholds respectively.)
Link to Batch Timeliness detail report
Link to Batch Cycle Time detail report
Productivity Tab: This tab displays current summary information for monitoring batches Tab Filters:
Batch Class
Batch Type
Operator
FIG. 4 illustrates one embodiment of a dashboard panel display including a summary of process cycle time and timeliness.
4. Staff Productivity—This panel displays the following
Table of users/operators with batches claimed and completed by activity
Link to Staff Productivity detail report
FIG. 5 illustrates one embodiment of a dashboard panel display of a staff productivity panel.
Reports
Batch Intake Report
A batch intake report may display batch count subtotals received between two dates by:
Date
Batch Class
Batch Type
Drill into detail on any data point
Report Prompts:
Date Range (Required, Default: previous two week period)
Batch Class
Batch Type
Batch Completions
The purpose of this report is to provide leadership with detailed batch completion information
Tabular report that displays batch count subtotals completed between two dates by:
Date
Batch Class
Batch Type
Drill into detail on data points
Report Prompts:
Date Range (Required, Default: previous two week period)
Batch Class
Batch Type
Batch Inventory Report
A batch inventory report may display the batches currently in inventory with the following data:
Batch Create Date
Batch Class (grouped)
Batch Type (grouped)
Batch Status (grouped)
Age in business hours
Age in business days
Drill into detail on data points
Report Prompts:
Age Range in Business Days (from #days to #days)
Batch Jeopardy Report
A batch jeopardy report may display the batches currently in jeopardy with the following data:
Batch Class (grouped)
Batch Type (grouped)
Batch Status (grouped)
Scan Date
Age in business hours
Age in business days
Drill into detail on data points
Report Prompts:
Age Range in Business Days (from #days to #days)
Batch Cycle Time Report
A batch cycle time report may display batch cycle times with the following data:

Batch Create Date
Batch Class (grouped)
Batch Type (grouped)
Batch Cycle Time
Report Prompts:
Batch Class
Batch Type
Batch Timeliness Report
A batch timeliness report may display batch cycle times with the following data:
Batch Create Date
Batch Class (grouped)
Batch Type (grouped)
Batch Timeliness Status
Report Prompts:
Batch Class
Batch Type FIG. 6 illustrates one embodiment of a method of identifying defects in request processing operations. Process defects may include, in some embodiments, one or more of the request that has become orphaned, a request that has become stuck, or a request that has vanished from a processing queue.

At 200, a request-made set of information including information about requests that have been made to a system is generated.

At 202, an active-processing set of information is generated. The active-processing set of information may include information on requests then being processed.

At 204, a comparison is made between the active-processing set of information and the request-made set of information. At 206, one or more process defects in the request processing operations are identified based on the comparison.

At 208, one or more requests associated the identified defects is flagged. The nature of process defect, the reason for a stall or non-conformance in the request, or both, may be determined. In some embodiments, corrective action is implemented in response to identification of the defect. Corrective action may be performed automatically by the system, manually, or both.

Figure 7:
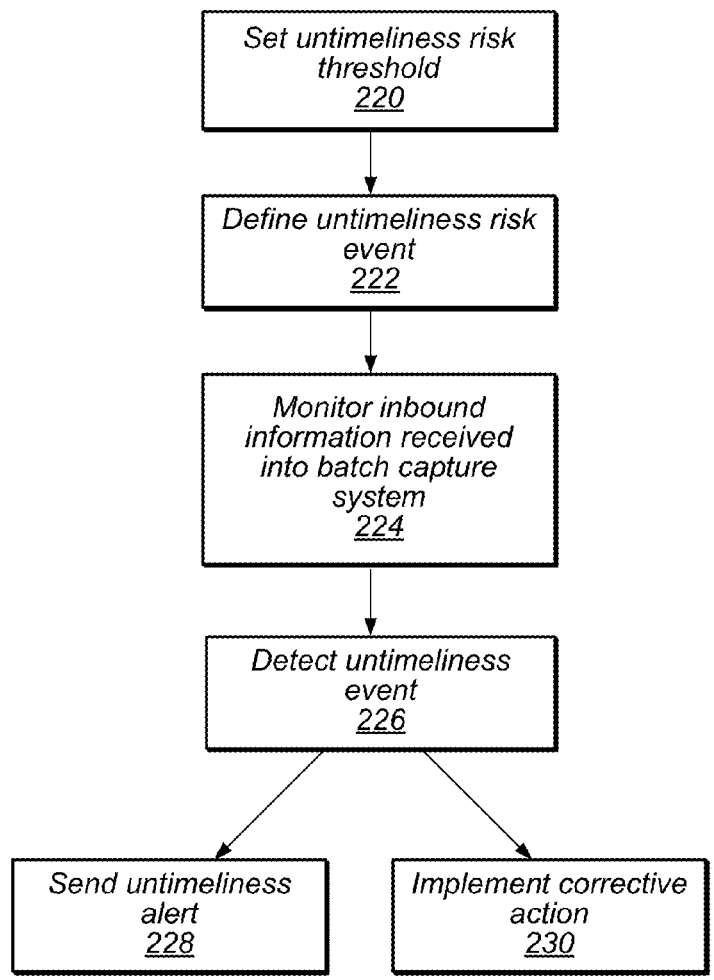
FIG. 7 illustrates a method of managing information received by batch capture into a system.

FIG. 7 illustrates a method of managing information received by batch capture into a system. At 220, one or more untimeliness risk thresholds are set. The untimeliness thresholds may include criteria for when a batch is at risk for being untimely.

At 222, one or more untimeliness risk events are defined. The untimeliness risk events may include, in one embodiment, meeting or exceeding one of the untimeliness risk thresholds.

At 224, inbound information received into a batch capture system (for example, by way of mail or facsimile transmission) is monitored. For each batch process, the system may determine work completed or claimed by a staff to a complete the one or more batch processes a length of time to a complete at least one of the one or more batch processes, a measure of timeliness for the batch process, and arrival and completion volume, and work completed or claimed by a staff to a complete the one or more batch processes. Key performance indicators for any or all of the batch processes may be displayed.

At 226, one or more untimeliness events are detected. At 228, in response to detection of one or more of the untimeliness risk events, one or more alerts are sent.

At 230, corrective action is performed in response to the untimeliness risk event. In some embodiments, corrective action may be performed automatically by the system.

In some embodiments, a service provider provide services to participants by way of cloud computing resources. In some embodiments, computation resources are rented or leased to customers of a service provider. In certain embodiments, services are provided to users at sites as software as a service ("SaaS") or platform as a service ("Paas"). Services may be provided to each user on an on-demand basis.

Networks employed in embodiments described herein may include any suitable data network or combination of networks that enable the exchange of information between electronic systems. For example, networks 106 described in FIG. 1 may include one or more Local Area Networks (LANs) such as Ethernet networks, as well as Wide Area Networks (WANs), Metropolitan Area Networks (MANs), or other data or telecommunication networks implemented over any suitable medium, such as electrical or optical cable, or via any suitable wireless standard such as IEEE 802.11 ("Wi-Fi"), IEEE 802.16 ("WiMax"), etc. In various embodiments, all or a portion of networks 106 may include the network infrastructure commonly referred to as the Internet. In other embodiments, networks may be entirely contained within an enterprise and not directly accessible from the Internet. In certain embodiments, information may be exchanged over a virtual private network. In one embodiment, information is exchanged over the internet, but encrypted in such a way to make a private network not accessible from the rest of the internet.

Computer systems may, in various embodiments, include components such as a CPU with an associated memory medium such as Compact Disc Read-Only Memory (CD-ROM). The memory medium may store program instructions for computer programs. The program instructions may be executable by the CPU. Computer systems may further include a display device such as monitor, an alphanumeric input device such as keyboard, and a directional input device such as mouse. Computer systems may be operable to execute the computer programs to implement computer-implemented systems and methods. A computer system may allow access to users by way of any browser or operating system.

Computer systems may include a memory medium on which computer programs according to various embodiments may be stored. The term "memory medium" is intended to include an installation medium, e.g., Compact Disc Read Only Memories (CD-ROMs), a computer system memory such as Dynamic Random Access Memory (DRAM), Static Random Access Memory (SRAM), Extended Data Out Random Access Memory (EDO RAM), Double Data Rate Random Access Memory (DDR RAM), Rambus Random Access Memory (RAM), etc., or a non-volatile memory such as a magnetic media, e.g., a hard drive or optical storage. The memory medium may also include other types of memory or combinations thereof. In addition, the memory medium may be located in a first computer, which executes the programs or may be located in a second different computer, which connects to the first computer over a network. In the latter instance, the second computer may provide the program instructions to the first computer for execution. A computer system may take various forms such as a personal computer system, mainframe computer system, workstation, network appliance, Internet appliance, personal digital assistant ("PDA"), television system or other device. In general, the term "computer system" may refer to any device having a processor that executes instructions from a memory medium.

The memory medium may store a software program or programs operable to implement embodiments as described herein. The software program(s) may be implemented in various ways, including, but not limited to, procedure-based techniques, component-based techniques, and/or object-oriented techniques, among others. For example, the software programs may be implemented using ActiveX controls, C++ (objects, JavaBeans, Microsoft Foundation Classes (MFC), browser-based applications (e.g., Java applets), traditional programs, or other technologies or methodologies, as desired. A CPU executing code and data from the memory medium may include a means for creating and executing the software program or programs according to the embodiments described herein.

Various embodiments may also include receiving or storing instructions and/or data implemented in accordance with the foregoing description upon a carrier medium. Suitable carrier media may include storage media or memory media such as magnetic or optical media, e.g., disk or CD-ROM, as well as signals such as electrical, electromagnetic, or digital signals, may be conveyed via a communication medium such as a network and/or a wireless link.

As used herein, a "communications network" refers to a system including one or more communication channels (for example, lines, satellite frequency, or radio waves) interconnecting one or more nodes (for example, servers, routers, computers, or communication devices). Examples of a "communications network" include the internet, a cellular telephone network, a local area network (LAN), or a wide area network (WAN).

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Methods may be implemented manually, in software, in hardware, or a combination thereof. The order of any method may be changed, and various elements may be added, reordered, combined, omitted, modified, etc. Changes may be made in the elements described herein without departing from the spirit and scope of the invention as described in the following claims.

What is claimed is:

1. A method of identifying defects in request processing operations, comprising:
    generating, by a process tracking system implemented on one or more computer systems, a request-made set of information comprising information about requests that have been made to a system;
    monitoring, by the process tracking system, request processing operations in the system, wherein monitoring request processing operations comprises:
        generating an active-processing set of information, wherein the active-processing set of information comprises information on requests then being processed; and
        comparing, for at least one request made to the system, the active processing set of information with the request-made set of information;
    identifying, by the process tracking system, based on the comparison between the active-processing set of information and the request-made set of information, one or more process defects in the request processing operations, wherein the process defect comprises a request that has become orphaned or stuck; and
    flagging at least one request associated with at least one of the identified defects.

2. The method of claim 1, wherein the process defect comprises a request that has vanished from a processing queue.

3. The method of claim 1, further comprising determining, for at least one of the process defects, the nature of the process defect.

4. The method of claim 1, further comprising determining, for at least one of the process defects, the reason for a stall or non-conformance in the request.

5. The method of claim 1, further comprising reporting at least one of the process defects to a user.

6. The method of claim 1, further comprising implementing, in response to identification of a process defect, corrective action for at least one of the processing defects.

7. A system, comprising:
    one or more computer systems configured to implement a process tracking system, wherein the process tracking system is configured to:
        generate a request-made set of information comprising information about requests that have been made to a system;
        monitor request processing operations in the system, wherein monitoring request processing operations comprises:
            generating an active-processing set of information, wherein the active-processing set of information comprises information on requests then being processed; and
            comparing, for at least one request made to the system, the active processing set of information with the request-made set of information;
        identify, based on the comparison between the active-processing set of information and the request-made set of information, one or more process defects in the request processing operations;
        determine, for at least one of the process defects, the nature of the process defect, wherein the process defect comprises a request that has become orphaned or stuck; and
        flag at least one request associated with at least one of the identified defects.

* * * * *